(12) United States Patent
Blasinski et al.

(10) Patent No.: US 11,142,184 B2
(45) Date of Patent: Oct. 12, 2021

(54) METHOD FOR OPERATING A HYBRID DRIVE APPARATUS FOR A MOTOR VEHICLE AS WELL AS A CORRESPONDING HYBRID DRIVE APPARATUS

(71) Applicant: AUDI AG, Ingolstadt (DE)

(72) Inventors: Boris Blasinski, Gaimersheim (DE); Florian Zink, Bad Rappenau (DE); René Schimmel, Bad Wimpfen (DE)

(73) Assignee: AUDI AG, Ingolstadt (DE)

( * ) Notice: Subject to any disclaimer, the term of this patent is extended or adjusted under 35 U.S.C. 154(b) by 316 days.

(21) Appl. No.: 16/430,623

(22) Filed: Jun. 4, 2019

(65) Prior Publication Data
US 2020/0039501 A1 Feb. 6, 2020

(30) Foreign Application Priority Data

Aug. 2, 2018 (DE) .......................... 102018212925.8

(51) Int. Cl.
*B60W 20/15* (2016.01)
*B60W 10/06* (2006.01)
(Continued)

(52) U.S. Cl.
CPC ............ *B60W 20/15* (2016.01); *B60W 10/06* (2013.01); *B60W 10/08* (2013.01); *F01N 3/021* (2013.01);
(Continued)

(58) Field of Classification Search
CPC .................................................... B60W 20/15
See application file for complete search history.

(56) References Cited

U.S. PATENT DOCUMENTS 8,660,725 B2 * 2/2014 Kawai ................... B60W 10/26
                                                              701/22
9,457,800 B2 * 10/2016 Heck ..................... B60W 10/08
(Continued)

FOREIGN PATENT DOCUMENTS

DE 102014109880 A1 1/2015
DE 102015210295 A1 2/2016
(Continued)

OTHER PUBLICATIONS

German Examination Report dated Mar. 29, 2019 in corresponding German Application No. 10 2018 212 925.8; 20 pages.
(Continued)

*Primary Examiner* — Michael A Berns
(74) *Attorney, Agent, or Firm* — Maier & Maier, PLLC

(57) ABSTRACT

A method for operating a hybrid drive apparatus for a motor vehicle, having an exhaust-gas-producing internal combustion engine and an electric motor. The internal combustion engine and the electric motor, respectively alone or at least sometimes jointly, provide a drive torque, wherein, when a start threshold value is exceeded by a demand variable. The internal combustion engine is started and the drive torque is at least partially generated by the internal combustion engine, and, when a stop threshold value is not met by the demand variable, the internal combustion engine is stopped and the drive torque is generated solely by means of the electric motor.

9 Claims, 1 Drawing Sheet

(51) Int. Cl.
  *B60W 10/08* (2006.01)
  *F01N 3/021* (2006.01)
  *B60K 6/22* (2007.10)

(52) U.S. Cl.
  CPC ........ *B60K 6/22* (2013.01); *B60W 2510/0676* (2013.01); *B60W 2710/0644* (2013.01); *B60W 2710/0666* (2013.01); *B60W 2710/081* (2013.01); *B60W 2710/083* (2013.01); *B60W 2720/10* (2013.01); *B60Y 2200/92* (2013.01); *B60Y 2300/192* (2013.01)

(56) References Cited

U.S. PATENT DOCUMENTS

| | | | |
|---|---|---|---|
| 10,246,078 B2* | 4/2019 | Hemminger | F01N 9/002 |
| 10,661,778 B2* | 5/2020 | Morisaki | B60W 20/13 |
| 10,669,979 B2* | 6/2020 | Kanno | F02B 75/18 |
| 10,882,513 B2* | 1/2021 | Onuma | F01N 3/023 |
| 2014/0024491 A1 | 1/2014 | Kobayashi et al. | |
| 2015/0019056 A1 | 1/2015 | Heck | |
| 2019/0257235 A1* | 8/2019 | Van Nieuwstadt | F01N 3/021 |
| 2020/0039501 A1* | 2/2020 | Blasinski | B60W 10/06 |

FOREIGN PATENT DOCUMENTS

| | | |
|---|---|---|
| DE | 102015015794 A1 | 8/2016 |
| DE | 102015222692 A1 | 5/2017 |
| FR | 2994920 A1 | 3/2014 |

OTHER PUBLICATIONS

European Search Report dated Jan. 10, 2020, in corresponding European patent application No. 19184334.1 including partial machine-generated English language translation; 9 pages.

* cited by examiner

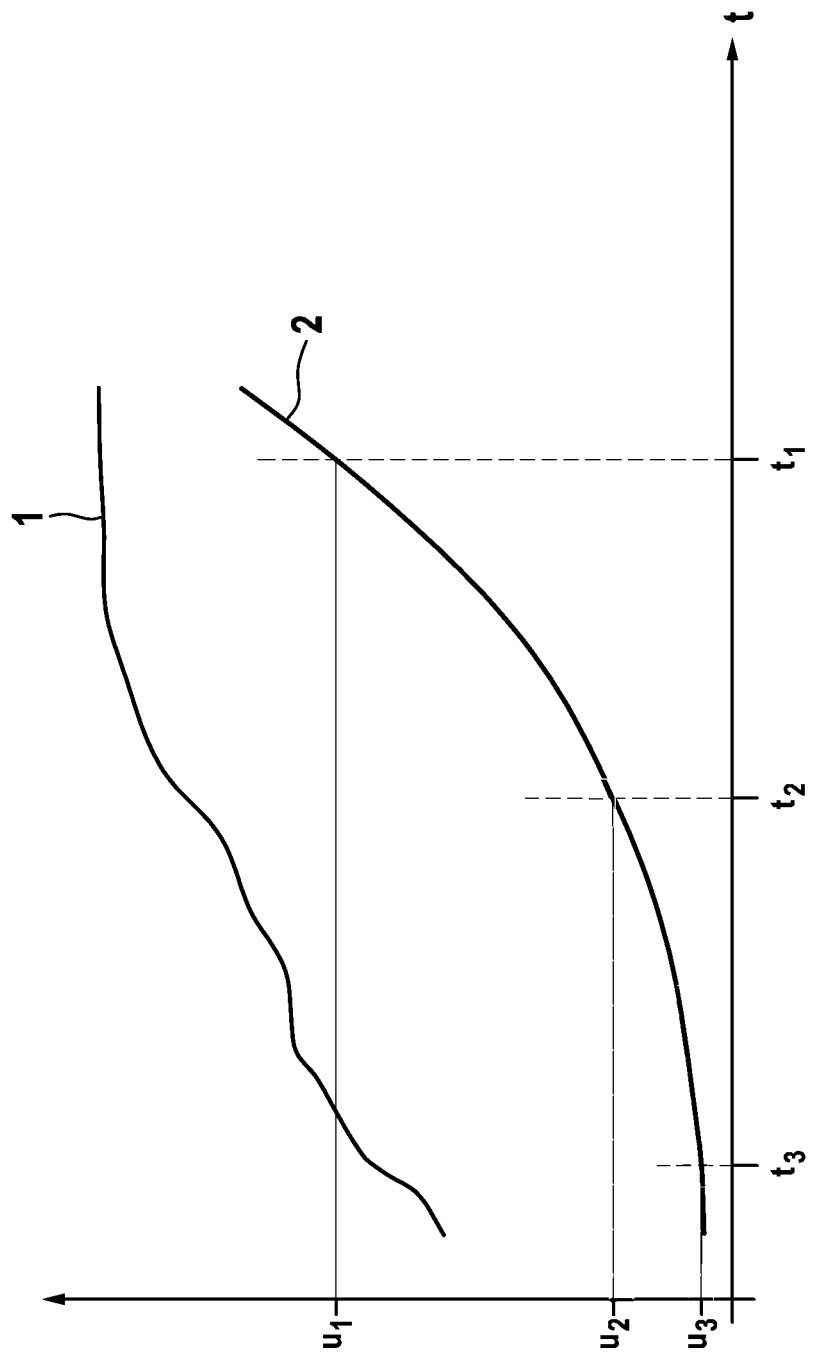

METHOD FOR OPERATING A HYBRID DRIVE APPARATUS FOR A MOTOR VEHICLE AS WELL AS A CORRESPONDING HYBRID DRIVE APPARATUS

FIELD

The invention relates to a method for operating a hybrid drive apparatus for a motor vehicle, having an exhaust-gas-producing internal combustion engine and an electric motor, wherein the internal combustion engine and the electric motor, respectively alone or at least sometimes jointly, provide a drive torque, wherein, when a start threshold value is exceeded by a demand variable, the internal combustion engine is started and the drive torque is at least partially generated by means of the internal combustion engine, and, when a stop threshold value is not met by the demand variable, the internal combustion engine is stopped and the drive torque is generated solely by means of the electric motor, and wherein the hybrid drive apparatus has a particulate filter for filtering the exhaust gas of the internal combustion engine. The invention further relates to a hybrid drive apparatus for a motor vehicle.

BACKGROUND

Publication DE 10 2014 109 880 A1, for example, is known from the prior art. This document relates to a method and systems for the emissions-compatible use of telematic input variables with a drive control system for function implementation. Said systems and method are provided to enable a reliable complete use of GPS and map information in a control system, for such use, to improve the off-cycle combustion economy in a plug-in hybrid vehicle with an electric motor and a combustion engine, which is provided during use of a global positioning system. The system comprises a global positioning system, a timer, and a processor, which contains a function that is executed therein, which controls the combustion engine based on a GPS location determination and its accuracy information.

Furthermore, publication DE 10 2015 015 794 A1 describes a method for heating up at least one exhaust after-treatment apparatus, arranged in an exhaust tract of a motor vehicle, which comprises a combustion engine and can be driven by means of the combustion engine, wherein, while the combustion of fuel remains in the combustion engine, an air flow is effected, which at least flows over the exhaust after-treatment apparatus, said air flow being heated by means of at least one electric heating element.

SUMMARY

The object of the invention is to propose a method for operating a hybrid drive apparatus for a motor vehicle, which has advantages as compared to other methods, in particular which significantly reduces soot quantity primarily occurring during warm-up of the internal combustion engine.

This is achieved according to the invention with a method for operating a hybrid drive apparatus having the features of claim 1. In doing so, it is provided that the start threshold value and/or the stop threshold value for reducing the development of soot inside the engine are variably selected as a function of an operating variable describing a temperature of the internal combustion engine.

The hybrid drive apparatus is used to drive a motor vehicle, that is to provide a torque based on the driving of a motor vehicle. The hybrid drive apparatus has the internal combustion engine as well as the electric motor. They are provided and formed to provide the drive torque supplied by the hybrid drive apparatus respectively alone or at least sometimes jointly. This means that the drive torque is provided only by the internal combustion engine and without using the electric motor, only by the electric motor and without using the internal combustion engine, or by the internal combustion engine and the electric motor jointly.

A sufficient provision of electrical energy requires that, for example when there is a sufficient state of charge of an electrical energy storage device, the electric motor is intended to provide the drive torque alone in a low-load condition, that is without using the internal combustion engine. The internal combustion engine is engaged only under a higher-load condition in order to provide the drive torque alone or by working together with the electric motor. To this end, it is provided to start the internal combustion engine if the start threshold value is exceeded by the demand variable. Vice versa, the internal combustion engine is stopped when the stop threshold value is not met by the demand variable.

The demand variable is a variable set on the hybrid drive apparatus, particularly a variable specified by a driver of the motor vehicle and/or a driver assistance apparatus of the motor vehicle. The demand variable preferably describes the load or the expected load. For example, a demanded drive torque, a demanded rotational speed, and/or a demanded output of the hybrid drive apparatus is used as the demand variable. For example, the demand variable is specified by the driver by means of a control apparatus, preferably an accelerator pedal. If the demand variable exceeds the start threshold value and if the internal combustion engine is stopped, it is thus assumed that the electric motor cannot provide the drive torque corresponding to the demand variable alone but rather that the internal combustion engine is required for this. It is then started accordingly.

Vice versa, when the internal combustion engine is started or running and the stop threshold value will not be reached by the demand variable, it is assumed that the drive torque corresponding to the demand variable can also be provided solely by means of the electric motor such that the internal combustion engine is not necessary for this. Thus, it is stopped in order to realize the lowest possible fuel consumption and low emissions values of the drive apparatus, at least to the extent that sufficient provision of the electric motor with electrical energy is ensured.

The start threshold value and the stop threshold value can essentially be arbitrarily selected. The stop threshold value may correspond to the start threshold value or be different from it. Especially preferably, the stop threshold value is less than the start threshold value such that a hysteresis-like behavior of the hybrid drive apparatus is achieved, because the internal combustion engine is started when the greater start threshold value is exceeded and is not stopped until the smaller stop threshold value is not maintained. However, the stop threshold value may also correspond to the start threshold value.

The starting of the internal combustion engine is understood to be a process in which the internal combustion engine is configured such that it subsequently can provide or provides at least a part of the drive torque. To this end, the internal combustion engine is initially brought to a non-zero rotational speed, particularly to a rotational speed which at least corresponds to a minimum rotational speed and/or an idle speed of the internal combustion engine.

The minimum rotational speed is the rotational speed starting at which the internal combustion engine can further increase its rotational speed, for example by means of a starter, independently, that is without an external drive. The idle speed is the speed at which the internal combustion engine is operated when it is not providing any drive torque but rather should only maintain its speed. The idle speed is preferably selected for a quiet and/or vibration-free running of the internal combustion engine. The idle speed is preferably greater than the minimum rotational speed.

The stopping of the internal combustion engine, on the other hand, is understood to be a reduction in the rotational speed of the internal combustion engine to less than the idle speed and/or the minimum speed. Especially preferably, the rotational speed of the internal combustion engine is changed to zero upon stopping such that the internal combustion engine is actually stationary after the stopping, that is has a rotational speed of zero.

The hybrid drive apparatus has the particulate filter, which is provided and formed for filtering the exhaust gas of the internal combustion engine. Especially preferably, all of the exhaust gas generated by the internal combustion engine is supplied to the particulate filter. The particulate filter is used to filter out particles contained in the exhaust gas, particularly soot particles. The particles, particularly the soot particles, develop in the internal combustion engine due to the combustion of fuel. During operation of the internal combustion engine, the soot load of the particulate filter of the internal combustion engine increases over time. Therefore, it is necessary to discharge the particles present in the particulate filter from time to time. To this end, a regeneration of the particulate filter takes place during which the particles present in the particulate filter are combusted or oxidized.

During regeneration, the particles are at least partially converted to ash. The ash remains in the particulate filter. In addition, ash which results from a combustion of a lubricant in the internal combustion engine can enter the particulate filter. The filtration capacity of the particulate filter depends significantly on its particle and/or ash load. The higher the load, that is the more particles and/or ash present in the particulate filter, the higher the filtration capacity.

This presents a particular challenge, particularly for new, particularly brand new particulate filters, which have only a small quantity of particles and/or ash. The same applies to the particulate filter after regeneration. When the particulate filter has a low particle and/or ash load, it is possible that a portion of the particles contained in the exhaust gas will not be filtered out but rather will penetrate through the particulate filter. However, this is not desirable. Such a low filtration capacity is particular problematic during the warm-up operation of the internal combustion engine, in which many particles develop, particularly inside the engine. Thus, the particle emission of the hybrid drive apparatus as a whole is particularly high in this warm-up operation.

The warm-up operation is understood to be operation of the internal combustion engine during which the internal combustion engine has a temperature which is less than its operating temperature. As soon as the temperature reaches the operating temperature, the warm-up operation ends. For example, when the operating temperature is reached, the warm-up operation is followed by normal operation, during which the temperature at least corresponds to the operating temperature and is ideally kept constant.

The described issue is especially important for the hybrid drive apparatus, because the internal combustion engine is at least partially stopped even during a driving operation of the motor vehicle, that is while the motor vehicle is moving, and the drive torque required to drive the motor vehicle is solely provided by means of the electric motor. During stoppage of the internal combustion engine, it cools down such that during a start or restart of the internal combustion engine, it again has a high particle emission, which affects the particle emission of the hybrid drive apparatus despite the particulate filter.

For this reason, it is now provided to adapt the start threshold value and/or the stop threshold value such that soot development within the engine is reduced. Soot development within the engine is understood to be the development of soot in the internal combustion engine during its operation due to the combustion of fuel. The more soot generated within the engine, the greater the impact of particles on the particulate filter and the more particles that can penetrate through the particulate filter and enter the outer environment of the hybrid drive apparatus due to the previously described low filtration capacity.

The start threshold value and/or the stop threshold value are selected such that the temperature of the internal combustion engine is maintained ideally in a range in which the soot development within the engine is comparatively low. To this end, the start threshold value and/or the stop threshold value are variably selected as a function of the operating variable. The operating variable, in turn, describes the temperature of the internal combustion engine or corresponds to it. Essentially, it may be provided to variably select the start threshold value but not the stop threshold value, the stop threshold value but not the start threshold value, or both the start threshold value and the stop threshold value as a function of the operating variable.

The variable selection is understood to be that the corresponding threshold value changes with the operating variable. The threshold value thus has a first value with a first value of the operating variable and a second value with a second value of the operating variable. In this case, the first value and the second value of the operating variable are different from one another and the same applies to the first value and the second value of the respective threshold value. Due to the described procedure, the temperature of the internal combustion engine is maintained, to the extent possible, in a range in which the soot emission of the entire hybrid drive apparatus is significantly reduced as compared to the known procedures during the start or restart of the internal combustion engine. For example, the start threshold value and/or the stop threshold value are selected such that the temperature of the internal combustion engine always corresponds to at least 50%, at least 60%, at least 70%, or at least 75% of an operating temperature of the internal combustion engine, based on which the internal combustion engine is regulated during its operation.

A further embodiment of the invention provides that an output of the hybrid drive apparatus, a rotational speed of the hybrid drive apparatus, a torque of the hybrid drive apparatus, and/or a speed of the motor vehicle are used as the demand variable. The demand variable is particularly understood to be a variable which is demanded by the driver of the motor vehicle or the driver assistance apparatus of the motor vehicle. For example, one of the aforementioned variables or a combination of at least a portion of all of the aforementioned variables is applied as the demand variable. The demand variable is stipulated by the driver of the motor vehicle, for example, by means of a corresponding input device, for example by means of the previously mentioned accelerator pedal. The use of one of the aforementioned variables or a combination of several of the aforementioned variables, particularly all of the aforementioned variables, as the demand variable has the advantage that the reduction of the soot development within the engine takes place in an especially simple and effective manner.

Within the scope of a further embodiment of the invention, it may be provided that a coolant temperature, a lubricant temperature, a cylinder wall temperature, a piston temperature, and/or a fresh gas throughput of the internal combustion engine are used as the operating variable. The start threshold value and/or the stop threshold value are variably selected by means of the operating variable and/or by means of a current value of the operating variable. The operating variable is at least indirectly, preferably however directly, associated with the temperature of the internal combustion engine. For example, the coolant temperature, the lubricant temperature, the cylinder wall temperature, or the piston temperature is used as the operating variable.

The coolant temperature describes the current temperature of a coolant, which is used to cool the internal combustion engine. For example, the coolant is present in a coolant circuit of the internal combustion engine. Preferably, water is used as the coolant such that the coolant can also be characterized as cooling water. The lubricant temperature describes the current temperature of a lubricant, which is used to operate the internal combustion engine. The lubricant is used to lubricate the internal combustion engine during its operation. Oil is preferably used as the lubricant.

The cylinder wall temperature describes the current temperature of a cylinder wall, which borders at least one combustion chamber of a cylinder of the internal combustion engine, preferably together with a piston and/or a cylinder top, which is preferably formed by a cylinder head of the internal combustion engine. The piston temperature describes the current temperature of the piston, which borders the combustion chamber at least in areas. The aforementioned temperatures can either be measured and/or simulated. In the former case, the measurement of the respective temperature is carried out by means of a temperature sensor. In the latter case, the temperature is determined with the assistance of a model.

In addition or as an alternative to one of the temperatures, the fresh gas throughput of the internal combustion engine can be applied as the operating variable. The fresh gas throughput is understood to be the quantity of a fresh gas per unit of time, which is supplied to the internal combustion engine, particularly to the at least one combustion chamber of the internal combustion engine, during its operation per unit of time. The fresh gas is, for example, fresh air or—in the case of exhaust gas recirculation—a fresh air/exhaust gas mixture. The use of one of the aforementioned operating variables or a combination of the aforementioned operating variables enables an especially precise setting of the start threshold value and/or of the stop threshold value such that the soot development within the engine is reduced.

An advantageous embodiment of the invention provides that the selection of the start threshold value and/or of the stop threshold value takes place continuously or discreetly. In the case of continuous selection, a direct mathematical dependency, for example, is provided between the respective threshold value and the operating variable. In other words, the threshold value is determined directly from the operating variable, namely, for example, with the assistance of the mathematical relationship. Any change in operating variable, regardless of its extent, leads to a change in the respective threshold value in this respect.

This is not the case for the discrete selection of the start threshold value and/or of the stop threshold value. In this case, it is provided, for example, that several operating variable ranges are stipulated, each of which are assigned to a value of the start threshold value and/or of the stop threshold value. If the operating variable or its value is within the respective operating variable range, the start threshold value or the stop threshold value is set to the value assigned to said operating variable range. A change in the threshold value takes place only with a switch between the operating variable ranges due to the operating variable or its value. The continuous selection enables an especially high level of accuracy, whereas the discrete selection is very simple to implement.

A further embodiment of the invention provides that the start threshold value and/or the stop threshold value is determined, with the continuous selection, by means of a mathematical function which has the operating variable as the input variable. The mathematical function establishes a relationship between the respective threshold value and the operating variable. The operating variable serves as the input variable, particularly as the only input variable, whereas the respective threshold value is present as the output variable of the mathematical function. This enables an especially precise selection of the respective threshold value.

A further embodiment of the invention provides that when a first setpoint is not reached by the operating variable, the start threshold value is reduced by a first start threshold differential value, starting from a start threshold output value, and/or that when the first setpoint is not reached by the operating variable, the stop threshold value is reduced by a first stop threshold differential value, starting from a stop threshold output value. In this regard, a threshold output value is specified for the respective threshold value, namely the start threshold output value for the start threshold value and the stop threshold output value for the stop threshold value.

If the operating variable corresponds at least to the first setpoint, the respective threshold value is set at the respective threshold output value. However, if the operating variable is less than the first setpoint, the respective threshold value is selected to be less, namely it is reduced by the respective first threshold differential value. This means that when the first setpoint is not reached by the operating variable, the start threshold value is equal to the start threshold output value minus the first start threshold differential value and/or the stop threshold value is equal to the stop threshold output value minus the first stop threshold differential value.

For example, the same first setpoint is used for the start threshold value and the stop threshold value. Alternatively however, different first setpoints can also be applied, wherein the first setpoint can be characterized as a first start threshold value for the start threshold value and as a first stop setpoint for the stop threshold value. In addition or as an alternative, the first start threshold differential value and the first stop threshold differential value may be selected as identical. Preferably however, they are different from one another. For example, the first start threshold differential value is less than the first stop threshold differential value. The described procedure enables an especially reliable reduction in the soot development within the engine.

A further embodiment of the invention provides that when a second setpoint is not reached by the operating variable, the start threshold value is reduced by a second start threshold differential value, starting from the start threshold output value, and/or that when the second setpoint is not reached by the operating variable, the stop threshold value is reduced by a second stop threshold differential value, starting from a stop threshold output value. In addition to the first setpoint, the second setpoint is provided in this regard. The second setpoint is especially preferably less than the first setpoint.

In order to modify the start threshold value and/or the stop threshold value, the second start threshold differential value or the second stop threshold differential value, respectively, is applied when the second setpoint is not reached by the operating variable. The statements for the first setpoint, the first start threshold differential value, and the first stop threshold differential value can be especially preferably applied in a similar manner in addition. The use of a second setpoint enables a further reduction in the soot development within the engine, because an especially fine tuning of the respective threshold value takes place.

A further embodiment of the invention provides that when the first setpoint and/or the second setpoint is not reached by the operating variable, the start threshold value and/or the stop threshold value are selected such that the drive torque is generated solely by means of the internal combustion engine. If the respective setpoint is not reached, the driving of the motor vehicle and/or the provision of the drive torque by the electric motor is no longer permitted. Instead, the drive torque should be generated solely by means of the internal combustion engine. If only the first setpoint is provided but not the second setpoint, the described operating procedure is preferably applied when the first setpoint is not met. On the other hand, if the second setpoint is present in addition to the first setpoint, the procedure is especially preferably used only upon failure of the operating variable to reach the second setpoint.

Finally, within the scope of a further embodiment of the invention, a provision may be that a gasoline internal combustion engine is used as the internal combustion engine. For example, the gasoline internal combustion engine is a direct-injection gasoline internal combustion engine. An especially large quantity of particles, particularly soot particles, develop during warm-up operation with the gasoline internal combustion engine and particularly with the direct-injection gasoline internal combustion engine. Accordingly, the described method can be especially advantageous applied to the gasoline internal combustion engine.

The invention further relates to a hybrid drive apparatus for a motor vehicle, particularly for implementing the method according to the statements within the scope of this description, wherein the hybrid drive apparatus has an exhaust-gas-producing internal combustion engine and an electric motor, wherein the internal combustion engine and the electric motor, respectively alone or at least sometimes jointly, provide a drive torque, wherein, when a start threshold value is exceeded by a demand variable, the hybrid drive apparatus is formed to start the internal combustion engine and to generate the drive torque at least partially by means of the internal combustion engine, and, when a stop threshold value is not met by the demand variable, to stop the internal combustion engine and to generate the drive torque solely by means of the electric motor, wherein the hybrid drive apparatus has a particulate filter for filtering the exhaust gas of the internal combustion engine. In doing so, it is provided that the hybrid drive apparatus is further formed to variably select the start threshold value and/or the stop threshold value in order to reduce the development of soot inside the engine a function of an operating variable describing a temperature of the internal combustion engine.

Reference has already been made to the advantages of such an embodiment of the hybrid drive apparatus as well as such procedure. Both the hybrid drive apparatus as well as the method for its operation may be further refined according to the statements within the scope of this description, to the extent that reference is made to them.

BRIEF DESCRIPTION OF THE DRAWINGS

The invention is explained in more detail in the following by means of exemplary embodiments, without limiting the invention. In doing so, the only FIGURE shows a diagram, in which curves for a speed of a motor vehicle as well as an output of a hybrid drive apparatus are entered over time as examples.

DETAILED DESCRIPTION

The FIGURE shows a diagram in which a curve 1 and a curve 2 are shown over time t purely schematically and as an example. Curve 1 in this case describes an output of a hybrid drive apparatus and curve 2 describes the speed of a motor vehicle, which is driven by means of the hybrid drive apparatus. The hybrid drive apparatus has an internal combustion engine and an electric motor, which respectively alone or at least sometimes jointly provide a drive torque of the hybrid drive apparatus for driving the motor vehicle.

The internal combustion engine is at least sometimes switched off and/or stopped during hybrid operation of the hybrid drive apparatus. In particular, it is provided to start the internal combustion engine and to generate at least a portion of the drive torque by means of the internal combustion engine when a demand variable is greater than a start threshold value or exceeds it. In the reverse, if the demand variable is less than a stop threshold value or fails to reach it, the internal combustion engine is stopped and the drive torque is generated solely by means of the electric motor.

In order to keep soot development within the engine as low as possible when starting the internal combustion engine, the start threshold value and/or the stop threshold value are variably selected as a function of an operating variable, wherein said operating variable describes a temperature of the internal combustion engine. The selection of the start threshold value and/or of the stop threshold value may take place continuously. In the exemplary embodiment shown here, discrete selection is implemented. To this end, a first setpoint $u_1$, a second setpoint $u_2$, and a third setpoint $u_3$ are provided, which are present at different points in time $t_1$, $t_2$, and $t_3$.

In the exemplary embodiment shown here, the driving speed of the motor vehicle is used as the operating variable; accordingly, setpoints $u_1$, $u_2$, and $u_3$ likewise describe driving speeds. If the operating variable, that is the driving speed, fails to reach the first setpoint $u_1$, the start threshold value is reduced by a first start threshold differential value, starting from a start threshold output value. In addition or as an alternative, the stop threshold value is reduced by a first stop threshold differential value, starting from a stop threshold output value.

If the operating variable fails to meet the second setpoint $u_2$, the start threshold value is reduced by a second start threshold differential value, starting from the start threshold output value, and/or the stop threshold value is reduced by a second stop threshold differential value, starting from the stop threshold output value. In addition, it may be provided that when the third setpoint $u_3$ is not met by the operating variable, the start threshold value is reduced by a third start threshold differential value, starting from the start threshold output value, and/or the stop threshold value is reduced by a third stop threshold differential value, starting from the stop threshold output value.

In this case, the third start threshold differential value is less than the second start threshold differential value, which, in turn, is less than the first start threshold differential value. In addition or as an alternative, the third stop threshold differential value is less than the second stop threshold differential value, which, in turn, is less than the first stop threshold differential value. Finally, this means that the start threshold value and/or the stop threshold value are selected to be lower, the lower the operating variable and/or its value. In this manner, the soot development within the engine can be significantly reduced, because the internal combustion engine is started more frequently and/or remains in operation longer after a start.

The invention claimed is:

1. A method for operating a hybrid drive apparatus for a motor vehicle, having an exhaust-gas-producing internal combustion engine and an electric motor, wherein the internal combustion engine and the electric motor, respectively alone or at least sometimes jointly, provide a drive torque, comprising:
  when a start threshold value is exceeded by a demand variable, the internal combustion engine is started and the drive torque is at least partially generated by the internal combustion engine, and
  when a stop threshold value is not met by the demand variable, the internal combustion engine is stopped and the drive torque is generated solely by the electric motor,
  wherein the hybrid drive apparatus has a particulate filter for filtering the exhaust gas of the internal combustion engine,
  wherein the start threshold value and/or the stop threshold value are variably selected to reduce soot generation within the internal combustion engine as a function of an operating variable describing a temperature of the internal combustion engine, and
  wherein, when a first setpoint is not reached by the operating variable, the start threshold value is reduced by a first start threshold differential value, starting from a start threshold output value, and/or when the first setpoint is not reached by the operating variable, the stop threshold value is reduced by a first stop threshold differential value, starting from a stop threshold output value.

2. The method according to claim 1, wherein an output of the hybrid drive apparatus, a rotational speed of the hybrid drive apparatus, a torque of the hybrid drive apparatus, and/or a speed of the motor vehicle are used as the demand variable.

3. The method according to claim 1, wherein a coolant temperature, a lubricant temperature, a cylinder wall temperature, a piston temperature, and/or a fresh gas throughput of the internal combustion engine are used as the operating variable.

4. The method according to claim 1, wherein the selection of the start threshold value and/or of the stop threshold value takes place continuously or discreetly.

5. The method according to claim 1, wherein the start threshold value and/or the stop threshold value is determined, with continuous selection, by a mathematical function which has the operating variable as the input variable.

6. The method according to claim 1, wherein when a second setpoint is not reached by the operating variable, the start threshold value is reduced by a second start threshold differential value, starting from the start threshold output value, and/or when the second setpoint is not reached by the operating variable, the stop threshold value is reduced by a second stop threshold differential value, starting from a stop threshold output value.

7. The method according to claim 6, wherein when the first setpoint and/or the second setpoint is not reached by the operating variable, the start threshold value and/or the stop threshold value are selected such that the drive torque is generated solely by the internal combustion engine.

8. The method according to claim 1, wherein a gasoline internal combustion engine is used as the internal combustion engine.

9. A hybrid drive apparatus for a motor vehicle, comprising:
  an exhaust-gas-producing internal combustion engine and an electric motor,
  wherein the internal combustion engine and the electric motor, respectively alone or at least sometimes jointly, provide a drive torque,
  wherein the hybrid drive apparatus is formed to start the internal combustion engine when a start threshold value is exceeded by a demand variable and to at least partially generate the drive torque by the internal combustion engine and to stop the internal combustion engine when a stop threshold value is not met by the demand variable and to generate the drive torque solely by the electric motor,
  wherein the hybrid drive apparatus has a particulate filter for filtering the exhaust gas of the internal combustion engine,
  wherein the hybrid drive apparatus is further formed to variably select the start threshold value and/or the stop threshold value in order to reduce soot generation within the internal combustion engine as a function of an operating variable describing a temperature of the internal combustion engine, and
  wherein, when a first setpoint is not reached by the operating variable, the start threshold value is reduced by a first start threshold differential value, starting from a start threshold output value, and/or when the first setpoint is not reached by the operating variable, the stop threshold value is reduced by a first stop threshold differential value, starting from a stop threshold output value.

* * * * *